Patented Apr. 4, 1933

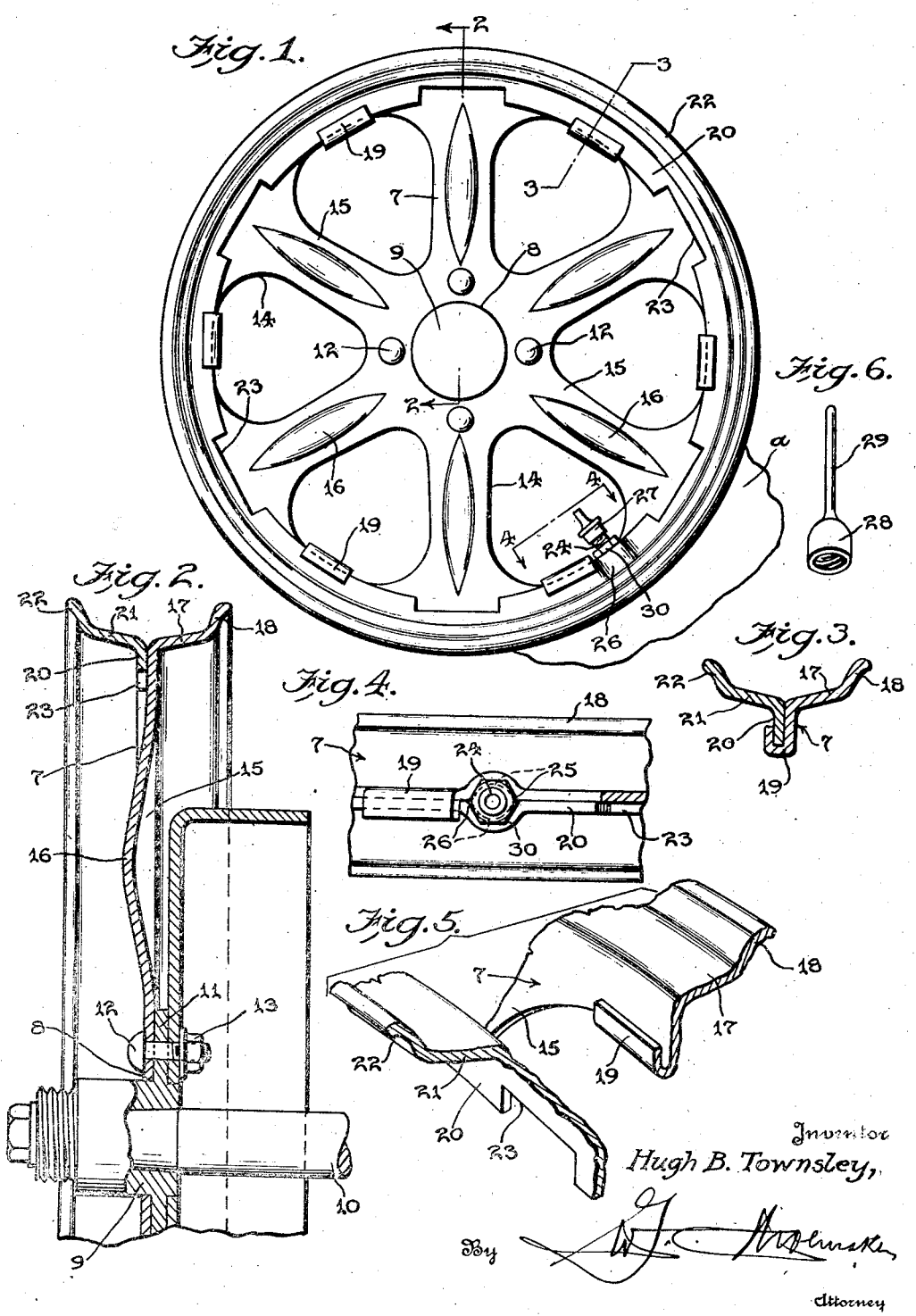

1,903,398

UNITED STATES PATENT OFFICE

HUGH B. TOWNSLEY, OF SPOKANE, WASHINGTON

VEHICLE WHEEL

Application filed January 30, 1931. Serial No. 512,388.

This invention relates to vehicle wheels.

One object of the present invention is to provide a wheel particularly adapted for motor vehicles, embodying among other characteristics, means whereby the tire may be easily and quickly mounted on the wheel and quickly removed therefrom when desired or necessary and without danger of the tire becoming detached from its mounting on the wheel in the event of a blowout or puncture or due to deflation of the tire from any other cause.

Another object of the invention resides in the provision of a vehicle wheel which is simple, inexpensive of manufacture, durable and effective in the matter of mounting pneumatic tires thereon.

A still further object of the invention is to provide a strong vehicle wheel embodying few parts and in which the parts comprising the wheel are free of the use of bolts and nuts and on which the pressure in the tire exerts force on parts comprising the wheel to assist in maintaining the parts against relative movement with relation to each other and in which the valve of the tire cooperates with the parts in the usual manner and in addition provides a positive means to lock the parts against accidental separation upon deflation of the tire, and which positive locking of the parts by the valve reinforces the locking means rendered effective by the air pressure within the tire.

With these and other objects in view, the invention consists in the construction and novel combination and arrangement of parts hereinafter described, illustrated in the accompanying drawing, and set forth in the claims hereto appended, it being understood that various changes in the form, proportion and minor details of construction, within the scope of the claims, may be resorted to without departing from the spirit of the invention or sacrificing any of the advantages thereof.

In the drawing:

Figure 1 is a side elevation embodying one form of the present invention.

Fig. 2 is a transverse sectional view on the line 2—2 of Fig. 1.

Fig. 3 is a sectional view on the line 3—3 of Fig. 1.

Fig. 4 is a sectional view on the line 4—4 of Fig. 1.

Fig. 5 is a fractional perspective view of the wheel.

Fig. 6 is a detail view of one form of implement employed for forcing the valve casing of the pneumatic tire through the rim of the wheel.

Referring now more particularly to the accompanying drawing, the reference character 7 indicates a dics or annular web of pressed sheet metal or other suitable material provided with a central opening 8 adapted to embrace the hub 9 of a wheel 10.

The hub 9 has a flange 11 to which the disc or web may be secured by means of bolts 12 and nuts 13 to resist relative movement of the disc or web and the hub 9 of the axle.

The disc or web between its peripheral edge and the said opening 8 is provided with a plurality of spaced openings 14 of any suitable shape. These openings 14 result in the formation of a plurality of spaced spokes 15 which may be of the shape illustrated particularly in Fig. 1, but which may take any other suitable shape in actual manufacture of the wheel. These spokes 15 may be strengthened or reinforced by longitudinally disposed ribs 16 formed in any suitable manner, as for instance, by a pressing operation. Obviously this pressing operation may take place at the time of forming the openings in the disc or web 7.

The disc or web 7 is provided at its peripheral edge with an integral annular rim member 17 provided at its marginal edge with a tire engaging flange 18 and adjacent each of the aforesaid openings 14 the disc or web is provided with a hook 19 for a purpose presently explained.

A removable ring 20 provided with an annular rim section 21 and a tire engaging flange 22 is adapted to cooperate with the rim section 17 and the tire engaging flange 18 of the disc or web 7 to provide for an effective mounting of a pneumatic or other tire a. This ring 20 has in its radially inward edge a plurality of equi-distantly spaced notches 23, there being as many notches 23 in the ring 20 as there are hooks 19 on the disc or web 7, with the notches of slightly greater length than the width of the hooks. These notches 23 are adapted to be rotated or turned into and out of registration with adjacent hooks 19 when it is desired to fasten the disc or web and ring together or to separate them, as the case may be. In other words, the ring and disc or web are fastened together when the hooks 19 are out of registration with the notches 23, as shown particularly in Fig. 1, and in such position the tire is held clamped tightly on the rim sections between the tire engaging flanges 18 and 22, as will be readily understood. To remove the tire from the wheel, it is simply necessary to turn the ring so that the notches 23 register with the respective hooks 19 when the ring can be readily withdrawn laterally away from the disc or web 7 and the tire readily removed, it being first necessary, however, to manipulate the tire valve casing 24, as will now be explained.

When the tire is mounted on the wheel the valve casing 24 is, of course, in a position projecting from the tire radially inwardly of the wheel, as may be gathered from Fig. 1. This valve casing 24 is mounted in an opening formed by two semi-circular registering recesses 25 and 26 of the disc or web and the ring, respectively, and which opening intersects centrally with the abutting faces of the disc or web and the ring 20, in view of which it is impossible to shift the notches 23 of the ring 20 into registration with the lugs or hooks 19 of the disc or web 7. This is due to the location of the valve casing 24 in a position across the line of abutment between the disc or web and the ring 20, as will be seen particularly in Fig. 4. Therefore, in order to move the notches 23 of the ring 20 into registration with the hooks 19 of the disc or web 7, it is first necessary to remove the cap 27 from the valve casing 24, and also the usual nut. The valve casing 24 being exteriorly screw threaded, I apply the interiorly threaded cupped end 28 of a suitable tool 29 to the valve casing until an effective connection between the tool and the valve casing is made, when the valve casing is forced through the opening formed by the aforesaid semi-circular recesses 25 and 26. The handle portion of the tool 29, being of smaller cross sectional diameter than the diameter of the valve casing, the handle portion may be moved to either side of the line of abutment between the disc or web 7 and ring 20 in order to permit a rotating or turning movement of the ring 20 to present the notches 23 thereof in registration with the hooks 19 of the disc or web 7 and permit separation of such parts and a ready removal of the tire from the rim of the wheel, as should now be well understood.

The tool 29 may remain connected with the valve casing when the tire is removed from the rim of the wheel for use in placing the tire back on the wheel, or the same may be disconnected at such time, as desired.

When the pneumatic tire is on the rim of the wheel and mounted for operating purposes, the pressure of air in the tire exerts such force on the flanges 18 and 22 of the disc or web 7 and ring 20, respectively, as to create a tight binding or clamping action of the hooks 19 of the disc or web against the ring 20 between the notches 23 and under ordinary conditions this clamping action between these two elements is sufficient to prevent accidental relative movement of the disc or web and ring, but this clamping action is reinforced and rendered positive by the valve casing 24 because of its mounting across the line of abutment of the disc or web and ring, as previously stated.

It will be understood that instead of supporting the ring 20 on the hooks 19 of the disc 7, the hooks may be carried by the ring and the notches 23 formed in a suitable manner in the disc. Other means than that shown and described for effecting the locking connection at the periphery of the disc and ring may be employed in combination with the positive valve casing or equivalent locking means.

Reference to vehicle wheels does not limit the use of my invention to automobiles, trucks and the like, but is intended by me to include wheels for toy vehicles, baby carriages, aeroplanes and all wheeled structures of whatever character.

From the foregoing it will be seen that I provide a comparatively simple, inexpensive, durable and effective wheel for automobiles or other vehicles, and that by virtue of the structural characteristics pointed out in detail above the parts are maintained together without the use of bolts and nuts, and in such a manner as to prevent accidental disconnection of the parts in the event of a sudden collapsing of the tire, and that, therefore, the tire is not liable to become accidentally separated from the wheel in the event of accidental deflation of the tire, as has been known to be the case in many instances, resulting in many accidents, due to inability of the driver to control the steering of the vehicle when a tire has been accidentally dislodged from the wheel.

It will be understood that even if the tire valve casing should become detached from the inner tube of the tire the valve casing would still perform the function of a positive locking connection between the disc and ring for the reason that the usual metal flange connection between the inner tube and the valve casing and the usual lock nut 30 would prevent the valve casing from working out of the opening in the wheel rim and prevent dislodgment of the valve casing from its locking position in the rim of the wheel.

What is claimed is:

1. In a vehicle wheel for pneumatic tires, a disc provided with a rim section and a tire engaging flange, a ring having a rim section and a tire engaging flange for cooperation with the rim section and flange of the disc, the disc having hooks engageable with the ring to support the latter on the disc, the ring having notches adapted to be rotated into registration with the hooks on the disc to permit separation of the ring from the disc to release the tire from the wheel, and means including the valve casing of the tire to positively prevent accidental rotative movement of the ring on the disc and thereby prevent accidental movement of the hooks along the rim of said ring into alignment with said notches while the tire is deflated.

2. In a vehicle wheel for pneumatic tires, a disc member provided with a rim section and a tire engaging flange, and a ring member having a rim section and a tire engaging flange for cooperation with the rim section and flange of the disc member, one of said members having a plurality of notches therein and the other member having elements engaging the other member between said notches to secure said members together and to maintain the tire on the wheel, said notches of one member being rotatable into registration with said elements of the other member to permit lateral separation of said members to effect removal of the tire from the wheel when the tire is deflated, the said members having aligning substantially semi-circular oppositely disposed recesses forming an opening through said rim portions across the line of abutment of said members to receive the valve casing of the tire in a position across said line of abutment to lock said members against rotative movement relative to each other when the tire is deflated and thereby prevent accidental registration of said elements with said notches and thereby effecting a positive locking of said members together and an effective clamping of the tire on the wheel.

3. In a vehicle wheel for pneumatic tires, a disc member provided with a rim section and a tire engaging flange, and a ring member having a rim section and a tire engaging flange for cooperation with the rim section and flange of the disc member, one of said members having a plurality of notches therein and the other member having radially outwardly directed elements engaging the other member between said notches to secure said members together and to maintain the tire on the wheel, said notches of one member being movable into registration with said elements of the other member to permit lateral separation of said members to effect removal of a deflated tire from the wheel, and means including the valve casing of the tire for positively locking said members against relative movement to prevent said elements and said notches from being brought accidentally into registration when the tire is deflated.

4. In a vehicle wheel for pneumatic tires, a disc member provided with a rim section and a tire engaging flange, a ring member having a rim section and a tire engaging flange for cooperation with the rim section and flange of the disc member, one of said members having a plurality of notches therein and the other member having elements engaging the other member between said notches to secure said members together and to maintain the tire on the wheel, said notches of one member being movable into registration with said elements of the other member to permit lateral separation of said members to effect removal of a deflated tire from the wheel, and means including the valve casing of the tire for positively locking said members against relative movement to prevent said elements and said notches from being brought accidentally into registration when the tire is deflated.

5. In a wheel, a disc provided with a rim section and a tire engaging flange, a ring movably supported on the disc and having a rim section and a tire engaging flange for cooperation with the rim section and flange of the disc to support a pneumatic tire on the periphery of the wheel, means operable when the tire is deflated to effect separation of said disc and ring to remove the tire, and means including the valve casing of the tire for positively locking said removable connecting means against operation and thereby positively locking a deflated tire on the rim sections of the disc and ring.

6. In a vehicle wheel for pneumatic tires, a disc provided with a rim section and a tire engaging flange, a ring having a rim section and a tire engaging flange cooperating with the disc rim section and flange, means for removably connecting the disc and ring together against lateral separation but permitting relative rotative movement of the disc and ring, the assembled disc and ring having an opening formed therein across the line of abutment of the disc and ring to receive the valve casing of the tire across the line of abutment of the disc and ring to lock the disc and ring against accidental rotative movement relative to each other.

7. A rim for pneumatic tires comprising a pair of annular rim sections having relative movement on each other and also having interlocking connections to hold the same together against accidental lateral separation under the influence of the air pressure in the tire when the tire is inflated, and means, including the valve casing of the tire intersecting the line of abutment of said rim sections for positively locking the rim sections against relative movement when the tire is on the rim and yet permitting relative movement of the rim sections to permit removal of a deflated tire when the valve casing is removed from coacting relation with the abutting rim sections.

8. A rim for pneumatic tires comprising a pair of annular rim sections, each having a tire engaging flange, and one section having relative movement with relation to the other section, one section having a plurality of spaced notches arranged below the respective rim section and flange, the other rim section having a plurality of spaced tongues arranged below the respective rim section and tire engaging flange and adapted to pass through the respective notches of the first mentioned rim section and be moved out of alignment with the respective notches for position between the latter so as to effect an interlocking connection between the rim sections to hold the same together against accidental lateral separation under the influence of the air pressure in the tire when the tire is inflated, and means, including the valve casing of the tire intersecting the line of abutment of said rim sections for positively locking the rim sections against accidental relative movement when the tire is on the rim and yet permitting removal of a deflated tire when the valve casing is removed from coacting relation with the abutting rim sections.

In testimony whereof I hereunto affix my signature this 29th day of January, 1931.

HUGH B. TOWNSLEY.